(12) United States Patent  (10) Patent No.: US 12,459,611 B2
Ishida et al.  (45) Date of Patent: Nov. 4, 2025

(54) GARBAGE COLLECTION WATERCRAFT

(71) Applicant: YAMAHA HATSUDOKI KABUSHIKI KAISHA, Iwata (JP)

(72) Inventors: Takuma Ishida, Shizuoka (JP); Junya Tsukada, Shizuoka (JP); Junya Onoue, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 615 days.

(21) Appl. No.: 17/885,599

(22) Filed: Aug. 11, 2022

(65) Prior Publication Data
US 2023/0135883 A1 May 4, 2023

(30) Foreign Application Priority Data

Nov. 4, 2021 (JP) .................... 2021-180000

(51) Int. Cl.
B63B 35/32 (2006.01)
B63B 1/12 (2006.01)
E02B 15/10 (2006.01)

(52) U.S. Cl.
CPC .............. B63B 35/32 (2013.01); B63B 1/121 (2013.01); E02B 15/10 (2013.01)

(58) Field of Classification Search
CPC ... B63B 35/32; B63B 1/121; B63B 2001/128; E02B 15/10; Y02A 20/204
USPC .................................. 114/26, 61.1, 73, 256
See application file for complete search history.

(56) References Cited

U.S. PATENT DOCUMENTS 9,334,617 B2 * 5/2016 Caraballo Benitez .. B63B 35/32
2020/0011020 A1 1/2020 Ceglinski

FOREIGN PATENT DOCUMENTS

| CN | 207683728 U | * | 8/2018 | ............. B63B 35/32 |
| CN | 111196338 A | | 5/2020 | |
| CN | 212332911 U | | 1/2021 | |
| CN | 212582631 U | | 2/2021 | |
| CN | 112591020 A | | 4/2021 | |
| EP | 1177973 A2 | | 2/2002 | |
| GB | 1503459 A | | 3/1978 | |
| JP | S5299293 U | | 7/1977 | |
| JP | 2008063823 A | | 3/2008 | |
| JP | 2020-500709 A | | 1/2020 | |
| WO | 2020083835 A1 | | 4/2020 | |

OTHER PUBLICATIONS

Office Action in JP2021-180000, mailed May 23, 2023, 3 pages.
Extended European Search Report in EP22189916.4, mailed Apr. 5, 2023, 7 pages.

* cited by examiner

Primary Examiner — Daniel V Venne
(74) Attorney, Agent, or Firm — Keating & Bennett, LLP

(57) ABSTRACT

A garbage collection watercraft includes a hull, a collection box, and a buoyant material. The collection box includes an intake port to receive garbage. The collection box is held by the hull so as to be movable between a collection position and a pull-up position. The collection box is at least partially located underwater at the collection position. The pull-up position is located higher than the collection position. The buoyant material is attached to the collection box. The buoyant material raises the collection box from the collection position to the pull-up position by a buoyant force.

7 Claims, 8 Drawing Sheets

GARBAGE COLLECTION WATERCRAFT

CROSS REFERENCE TO RELATED APPLICATIONS

This application claims the benefit of priority to Japanese Patent Application No. 2021-180000 filed on Nov. 4, 2021. The entire contents of this application are hereby incorporated herein by reference.

BACKGROUND OF THE INVENTION

1. Field of the Invention

The present invention relates to a garbage collection watercraft.

2. Description of the Related Art

In recent years, from the perspective of protecting the marine environment toward Sustainable Development Goals (so-called SDGs), activities have been promoted to protect the abundance of the sea by collecting and reducing garbage and microplastics floating on the water. For example, conventionally, there is known a marine garbage collection device that collects garbage floating on the sea by flowing in and collecting the garbage together with seawater (see, for example, Japanese Laid-open Patent Application Publication No. 2020-500709).

In addition, a garbage collection watercraft is used to collect garbage floating in the water. The garbage collection watercraft is equipped with a collection box and a crane. The garbage collection watercraft takes in the garbage to the collection box by moving the collection box in a state of being submerged in the water. Then, by lifting the collection box with the crane, the garbage is collected from the collection box.

The garbage collection watercraft as described above is a large ship for mounting the crane and the power source for the crane. Therefore, it cannot be used in a narrow place such as a harbor or a waterway. In addition, it is difficult to mount the crane and the power source on a small ship because the loading capacity is limited. Therefore, it is necessary for a worker to manually pull up the collection box, which imposes a heavy burden on the worker.

SUMMARY OF THE INVENTION

Preferred embodiments of the present invention reduce the size of garbage collection watercraft and reduce the burden on workers.

A garbage collection watercraft according to a preferred embodiment of the present invention includes a hull, a collection box, and a buoyant material. The collection box includes an intake port to receive garbage. The collection box is held on the hull so as to be movable between a collection position and a pull-up position. The collection box is located at least partially underwater at the collection position. The pull-up position is located higher than the collection position. The buoyant material is attached to the collection box. The buoyant material raises the collection box from the collection position to the pull-up position by a buoyant force.

According to a preferred embodiment of the present invention, the buoyant force of the buoyant material causes the collection box to move from the collection position to the pull-up position. Because it is not necessary to mount a crane and a power source on the hull, the hull is miniaturized. In addition, the buoyant force of the buoyant material moves the collection box, which reduces the burden on the worker.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
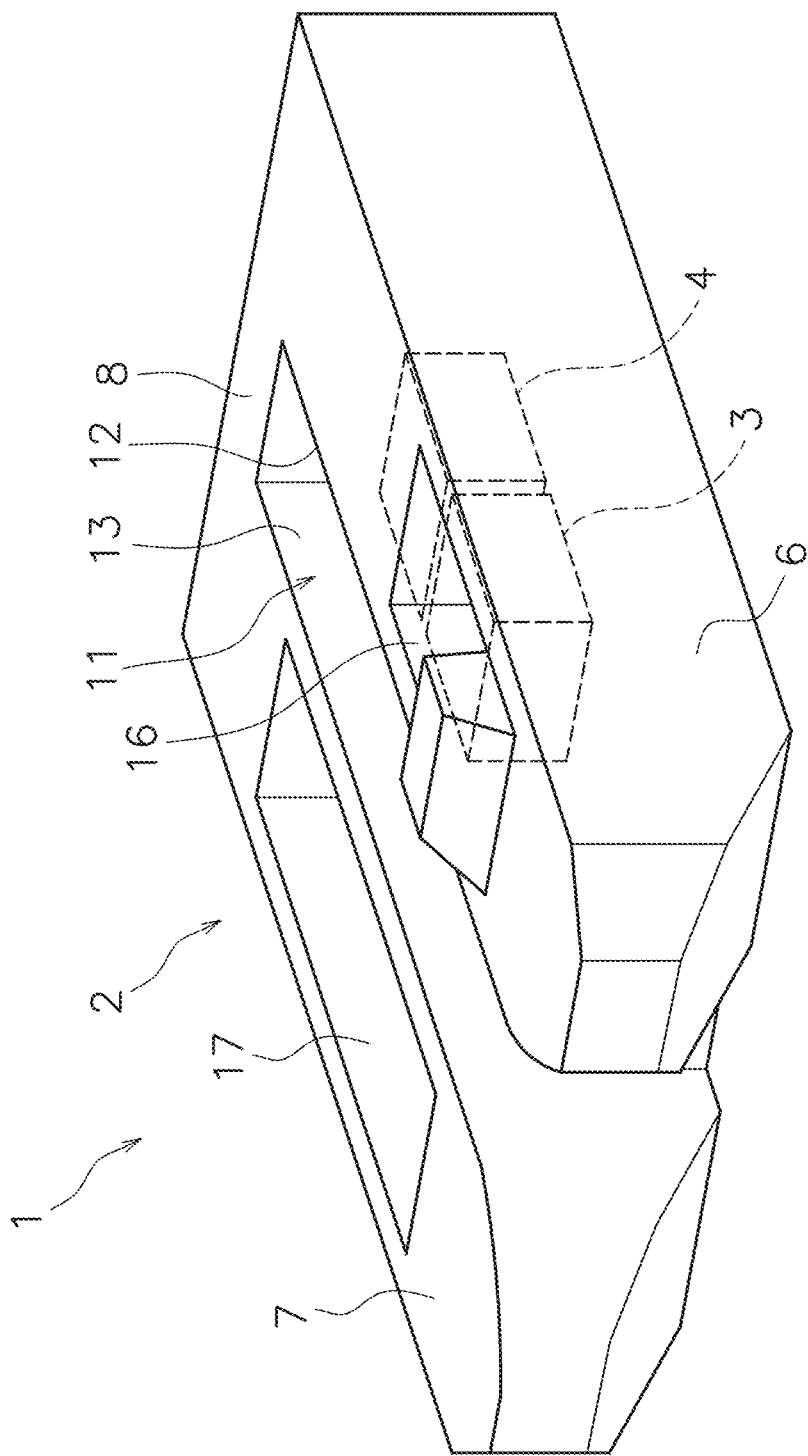
FIG. 1 is a perspective view showing a garbage collection watercraft according to a preferred embodiment of the present invention.
Figure 2:
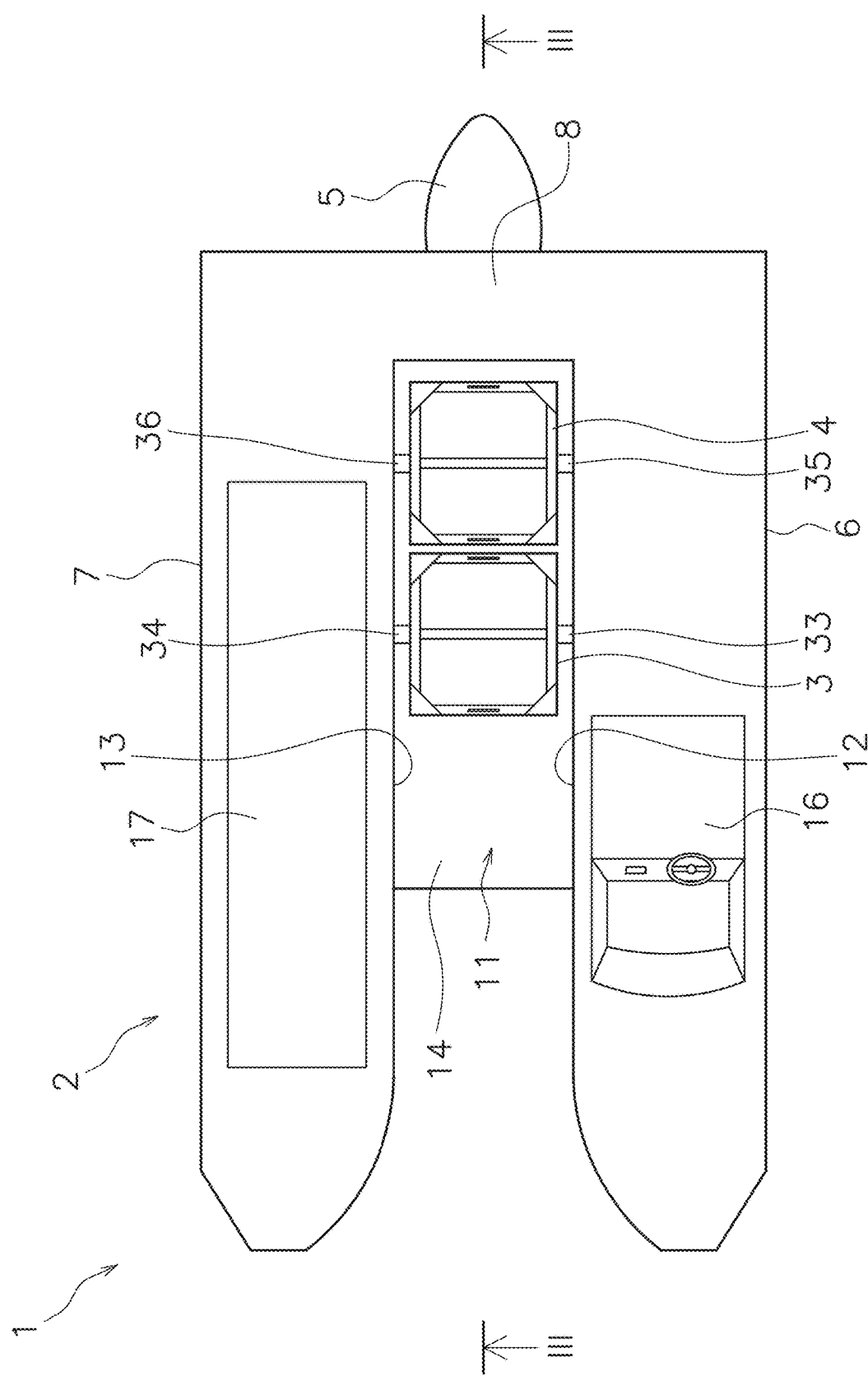
FIG. 2 is a top view of the garbage collection watercraft.
Figure 3:
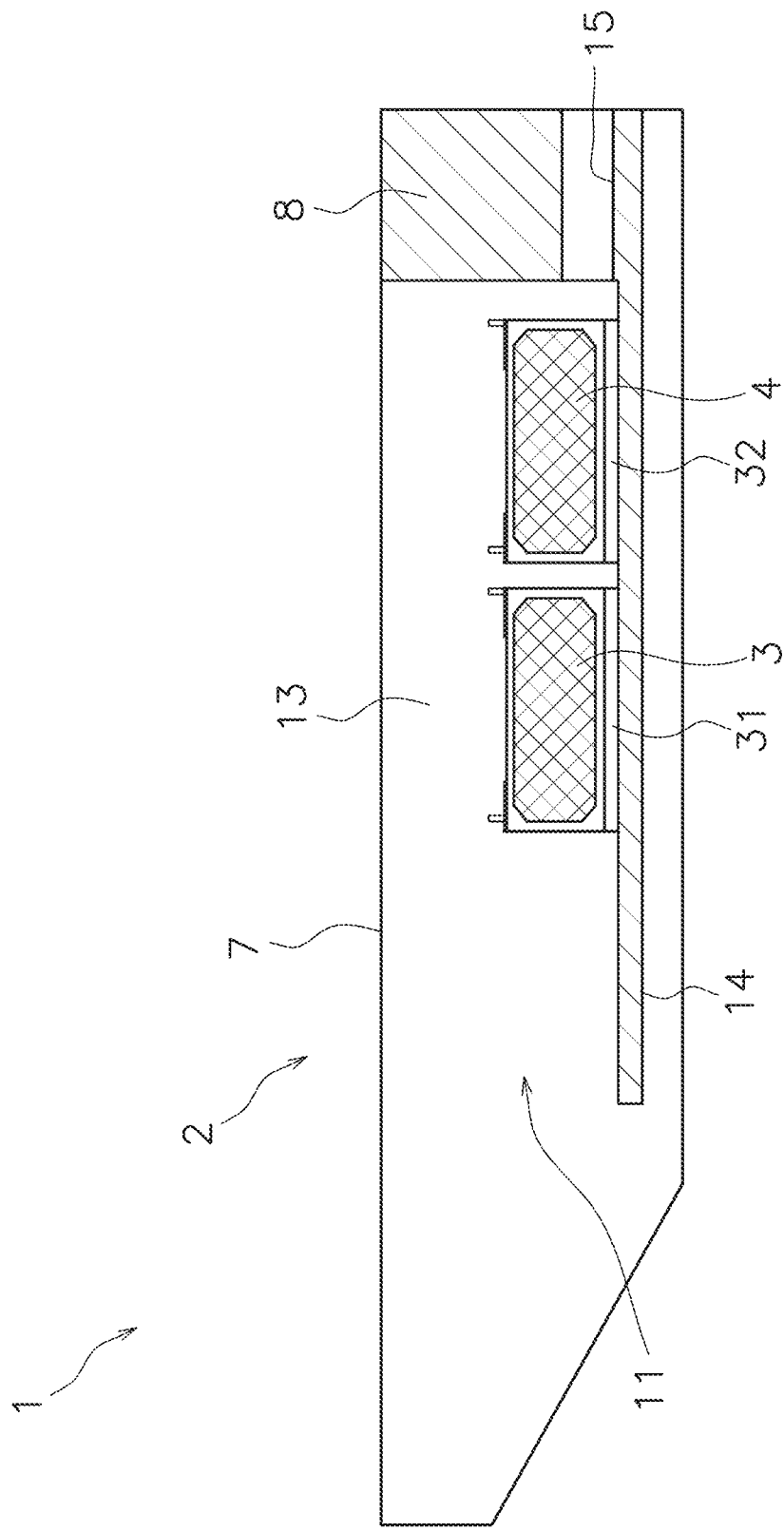
FIG. 3 is a cross-sectional view taken along the line in FIG. 2.

Hereinafter, garbage collection watercrafts according to preferred embodiments of the present invention will be described with reference to the drawings. FIG. 1 is a perspective view showing a garbage collection watercraft 1 according to a preferred embodiment of the present invention. FIG. 2 is a top view of the garbage collection watercraft 1. FIG. 3 is a cross-sectional view taken along the line III-III in FIG. 2. As shown in FIGS. 1 to 3, the garbage collection watercraft 1 includes a hull 2 and collection boxes 3 and 4.

As shown in FIG. 2, a marine propulsion device 5 is attached to the hull 2. The marine propulsion device 5 is, for example, an outboard motor. However, the marine propulsion device 5 may be another propulsion device such as a jet propulsion device. The marine propulsion device 5 generates a propulsive force to move the hull 2.

The hull 2 includes a first boat 6, a second boat 7, and a connecting portion 8. The first boat 6 and the second boat 7 each have a shape extending in a front-rear direction of the hull 2. The first boat 6 and the second boat 7 are spaced apart from each other in a left-right direction of the hull 2. The connecting portion 8 extends in the left-right direction of the hull 2 and connects the first boat 6 and the second boat 7.

The hull 2 includes a box storage area 11. The box storage area 11 is located between the first boat and the second boat 7. The box storage area 11 is open toward the front. The box storage area 11 is open upward. The box storage area 11 is located between a first inner side surface 12 of the first boat 6 and a second inner side surface 13 of the second boat 7. A bottom plate 14 is located below the box storage area 11.

As shown in FIG. 3, the hull 2 includes a through hole 15. The through hole 15 is located behind the box storage area 11. The through hole 15 extends from the box storage area 11 to the rear of the hull 2. As the garbage collection watercraft 1 moves forward, water passes between the first boat 6 and the second boat 7 and enters the box storage area 11. The water flows from the box storage area 11 to the rear of the hull 2 through the through hole 15.

The hull 2 includes a cockpit 16 and a work space 17. The work space 17 is adjacent to the box storage area 11. The work space 17 is a place for a worker to perform work of pulling up garbage from the collection boxes 3 and 4. For example, the cockpit 16 is provided on the first boat 6. The work space 17 is provided on the second boat 7.

Figure 4:
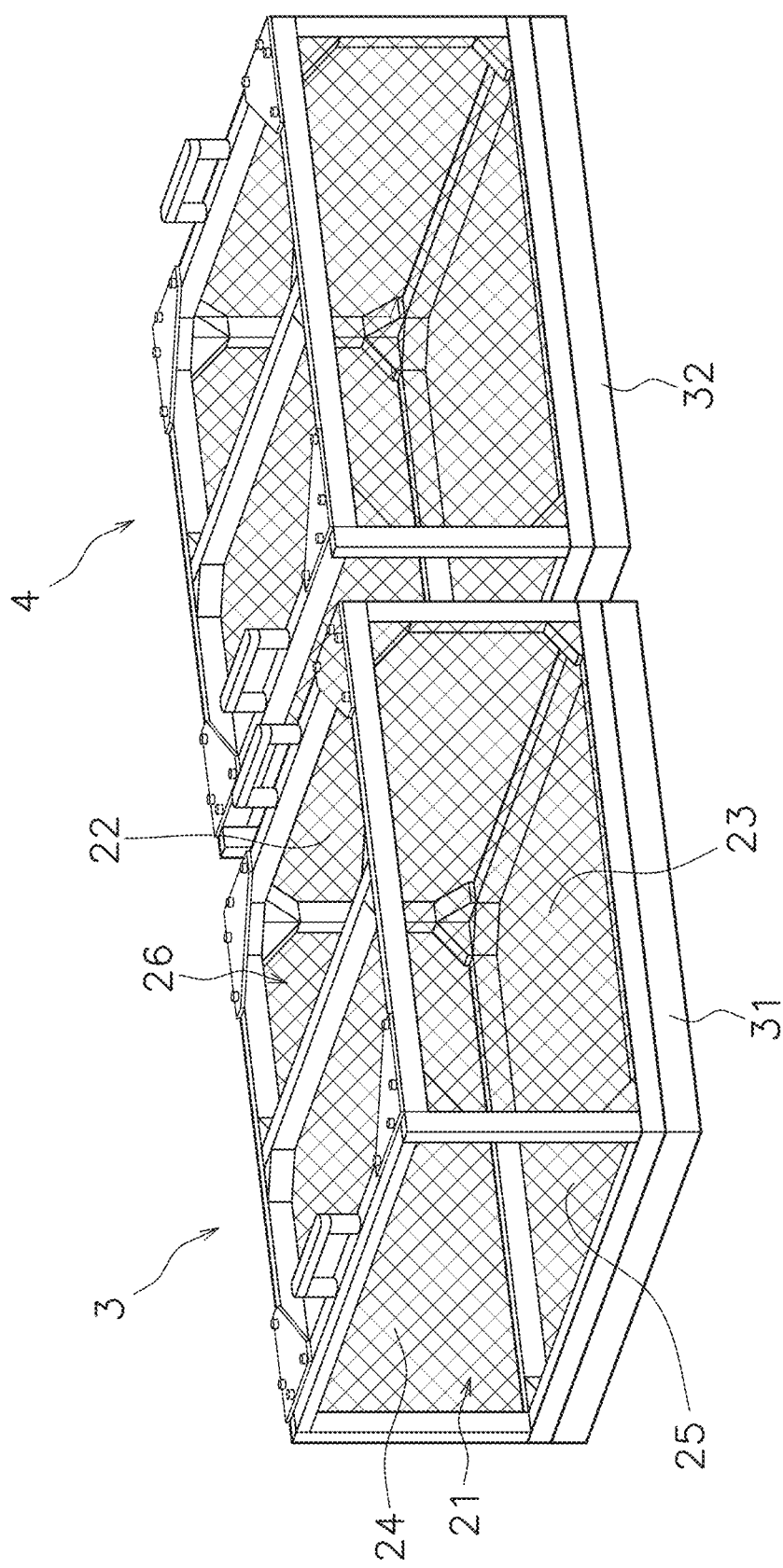
FIG. 4 is a perspective view of a collection box.

The collection boxes 3 and 4 are located in the box storage area 11. In the present preferred embodiment, the garbage collection watercraft 1 includes a plurality of collection boxes 3 and 4. FIG. 4 is a perspective view of the collection boxes 3 and 4. The plurality of collection boxes 3 and 4 include a first collection box 3 and a second collection box 4. The first collection box 3 and the second collection box 4 are separate bodies from each other.

The first collection box 3 includes an intake port 21 to receive garbage. The intake port 21 is provided on the front surface of the first collection box 3. Mesh is provided on a rear surface 22, both side surfaces 23 and 24, and a bottom surface 25 of the first collection box 3, respectively. An upper surface 26 of the first collection box 3 is open.

At least one of the side surfaces 23 and 24 of the first collection box 3 may be open. Mesh may be provided on the upper surface 26 of the first collection box 3. The second collection box 4 has the same structure as the first collection box 3. The second collection box 4 is located behind the first collection box 3.

A first buoyant material 31 is attached to the first collection box 3. The first buoyant material 31 is attached to the bottom surface 25 of the first collection box 3. The first buoyant material 31 is made of a foamed material, e.g., a resin such as urethane. Alternatively, the first buoyant material 31 may be filled with air. The first buoyant material 31 raises the first collection box 3 by the buoyant force.

Figure 5A:
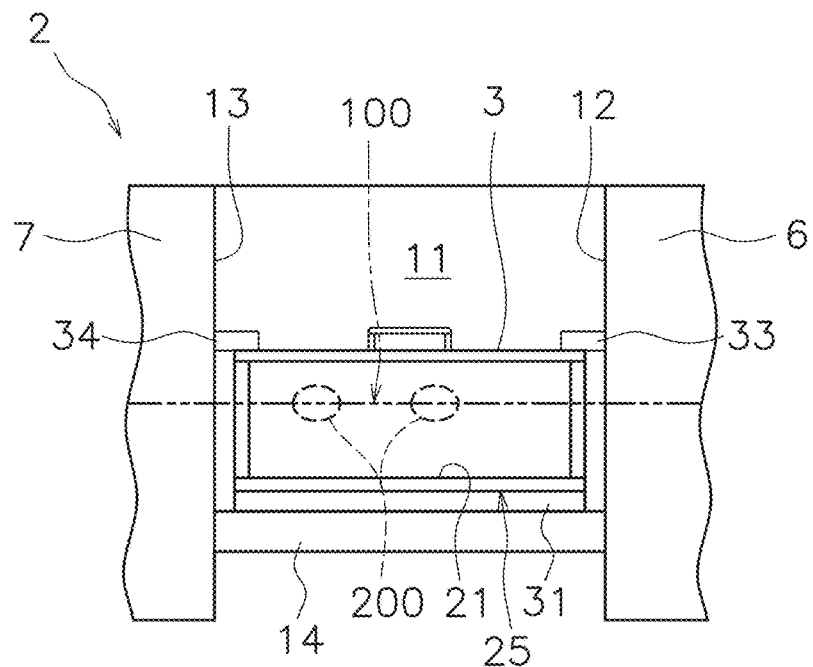
FIG. 5A is a front view showing the collection box in a box storage area.
Figure 5B:
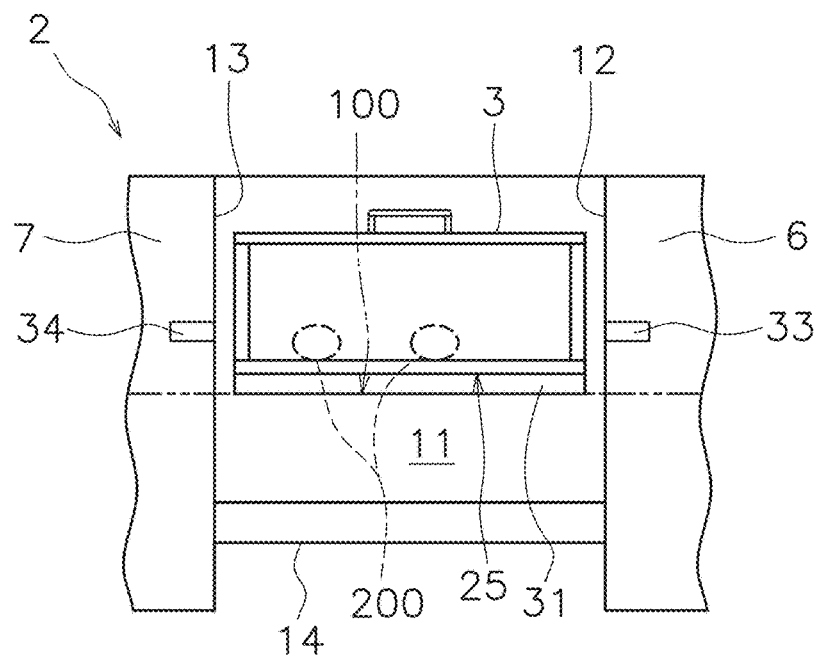
FIG. 5B is a front view showing the collection box in the box storage area.

FIGS. 5A and 5B are front views showing the first collection box 3 in the box storage area 11. In FIG. 5A, the first collection box 3 is located at the collection position. In FIG. 5B, the first collection box 3 is located at the pull-up position. The pull-up position is located above the collection position. The first collection box 3 is movably held by the hull 2 between the collection position and the pull-up position.

As shown in FIG. 5A, at least a portion of the first collection box 3 is located underwater at the collection position. The bottom surface 25 of the first collection box 3 is located below the water surface 100 at the collection position. The garbage collection watercraft 1 includes stoppers 33 and 34. The stoppers 33 and 34 are attached to the hull 2. The stoppers 33 and 34 are able to be switched between a fixed state and a released state.

As shown in FIG. 5A, the stoppers 33 and 34 fix the first collection box 3 to the hull 2 in the fixed state. For example, the stoppers 33 and 34 fix the first collection box 3 by pressing the first collection box 3 from the lateral side. Alternatively, the stoppers 33 and 34 may be engaged with the first collection box 3.

The first collection box 3 is fixed by the stoppers 33 and 34 in a state of being submerged at the collection position. The stoppers 33 and 34 hold the first collection box 3 at the collection position against the buoyant force of the first buoyant material 31. In this state, when the garbage collection watercraft 1 moves forward, the underwater garbage 200 enters the first collection box 3 from the intake port 21.

The stoppers 33 and 34 release the first collection box 3 in the released state. As a result, as shown in FIG. 5B, the first collection box 3 is raised to the pull-up position by the buoyant force of the first buoyant material 31. In this state, the worker pulls up the garbage 200 from the first collection box 3.

Figure 6:
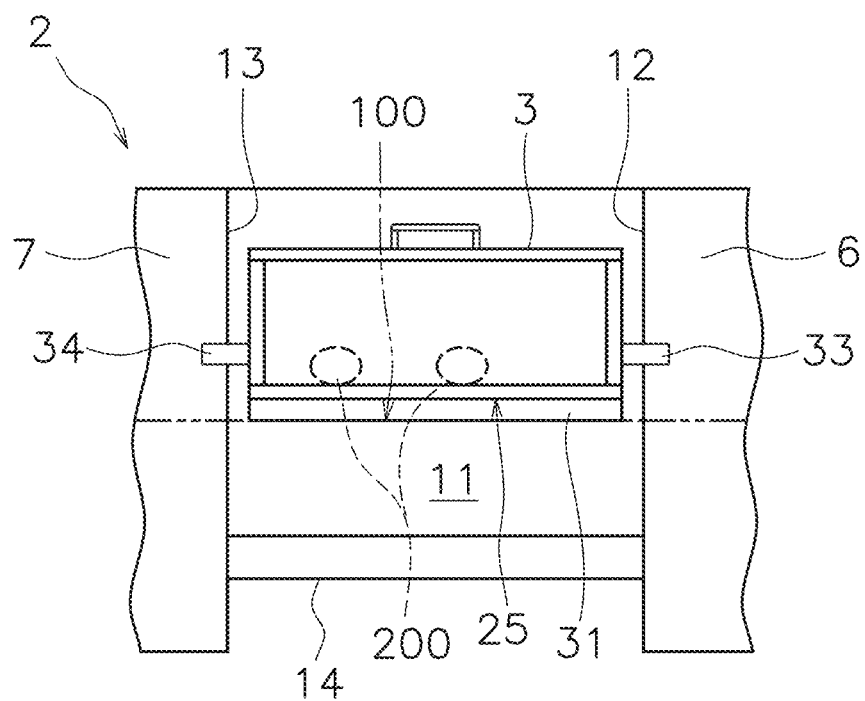
FIG. 6 is a front view showing the collection box in the box storage area.

As shown in FIG. 6, the first collection box 3 is fixed to the pull-up position by setting the stoppers 33 and 34 to the fixed state while the first collection box 3 is located at the pull-up position. As a result, the first collection box 3 is stably held by the hull 2, so that the work of pulling up the garbage 200 becomes easier.

As shown in FIGS. 3 and 4, a second buoyant material 32 is attached to the second collection box 4. Like the first collection box 3, the second collection box 4 is movable to the collection position and the pull-up position, and is fixed to the collection position and the pull-up position by the stoppers 35 and 36 shown in FIG. 2. Further, when the stoppers 35 and 36 are in the released state, the second collection box 4 is raised from the collection position to the pull-up position by the buoyant force of the second buoyant material 32.

Figure 7A:
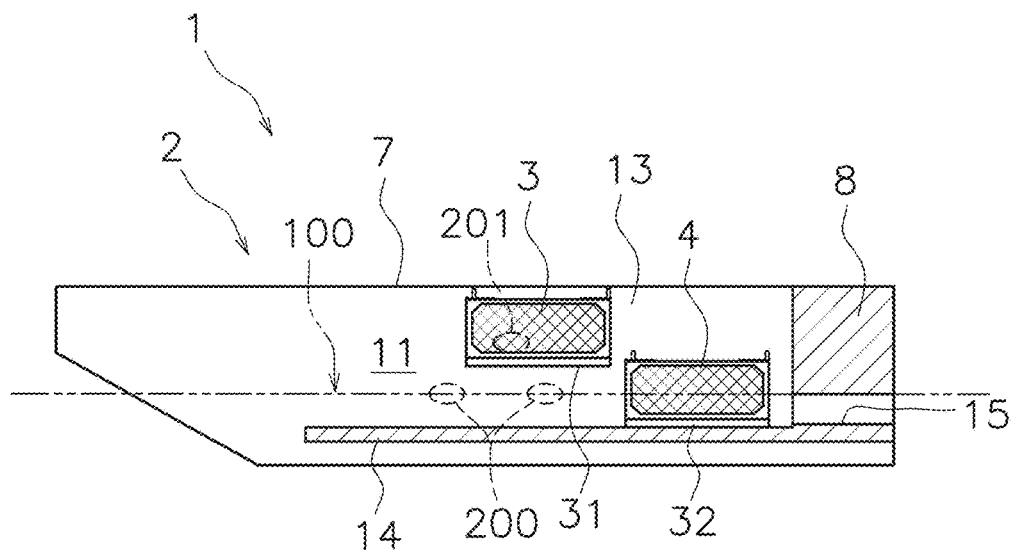
FIG. 7A is a side sectional view of the garbage collection watercraft.
Figure 7B:
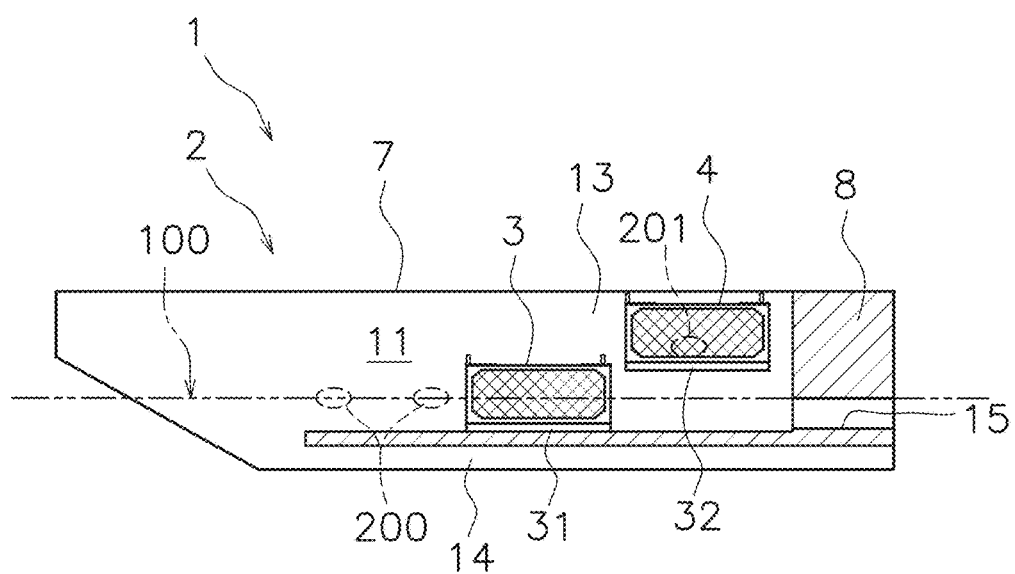
FIG. 7B is a side sectional view of the garbage collection watercraft.

For example, as shown in FIG. 7A, the second collection box 4 may be located at the collection position while the first collection box 3 is located at the pull-up position. As a result, the underwater garbage 200 is taken into the second collection box 4 while the garbage 201 is pulled from the first collection box 3. Further, as shown in FIG. 7B, the first collection box 3 may be located at the collection position while the second collection box 4 is located at the pull-up position. As a result, the underwater garbage 200 is taken into the first collection box 3 while the garbage 201 is pulled from the second collection box 4.

In the garbage collection watercraft 1 according to a preferred embodiment of the present invention, the collection boxes 3 and 4 move from the collection position to the pull-up position due to the buoyant force of the buoyant materials 31 and 32. Therefore, it is not necessary to mount a crane and a power source on the hull 2, and the hull 2 is miniaturized. Further, since the collection boxes 3 and 4 are moved by the buoyant force of the buoyant materials 31 and 32, the burden on the worker in the work of pulling up the garbage from the collection boxes 3 and 4 is reduced.

Although preferred embodiments of the present invention have been described above, the present invention is not limited to the above preferred embodiments, and various modifications can be made without departing from the gist of the present invention.

The number of collection boxes is not limited to two, and may be one or more than two. The plurality of collection boxes may be located side by side not only in the front-rear direction but also in the left-right direction. The shape of the collection box is not limited to that of the above preferred embodiments, and may be changed.

Figure 8:
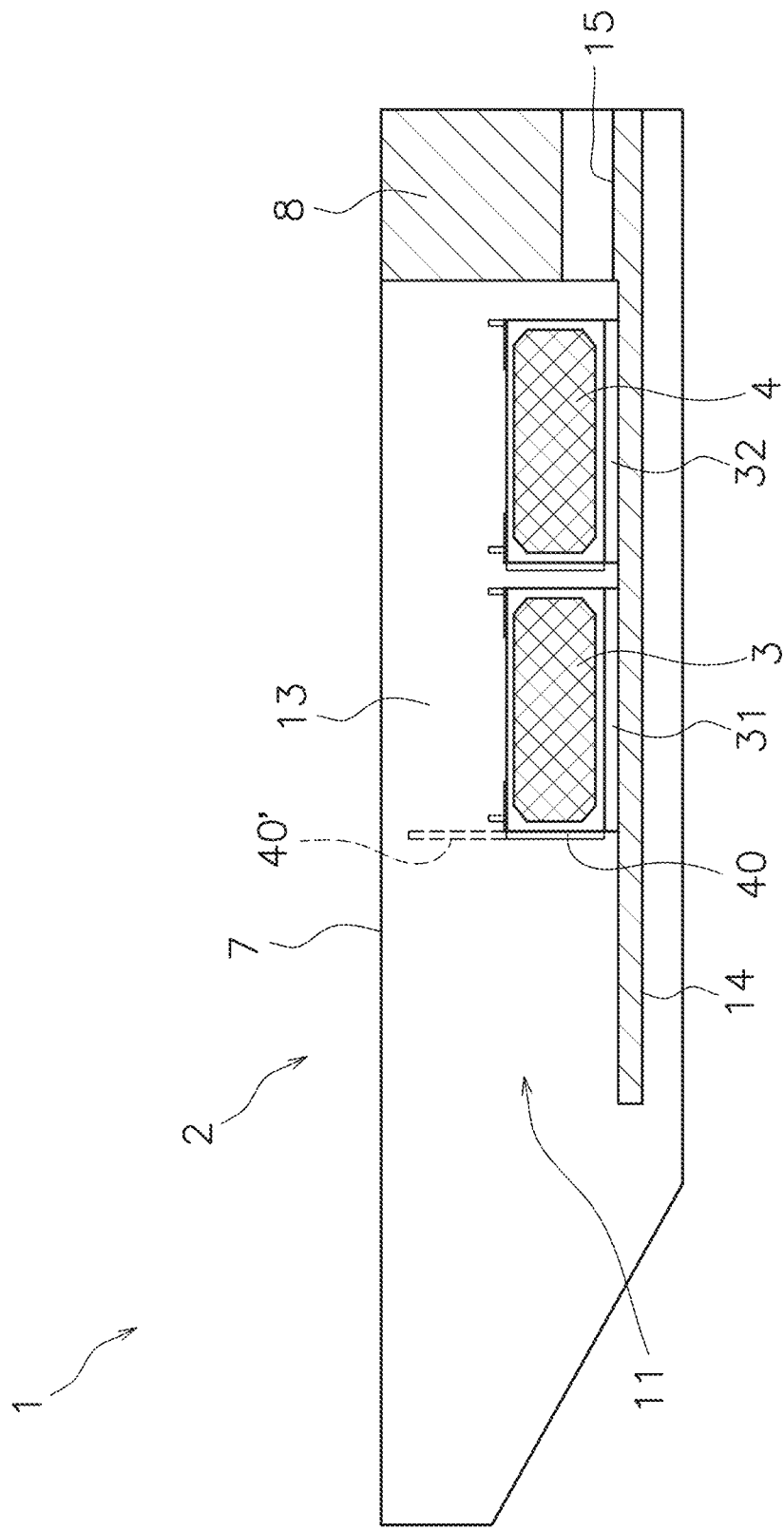
FIG. 8 is a side sectional view of the garbage collection watercraft according to another preferred embodiment of the present invention.

As shown in FIG. 8, a lid 40 configured to open and close the intake port 21 may be attached to the collection box 3. A lid may be attached to the collection box 4 as well. The lid 40 may be movable between a closed position and an open position. The lid 40 closes the intake port 21 in the closed position. The lid 40 opens the intake port 21 in the open position. The reference numeral 40' indicated by the broken line in FIG. 8 indicates the lid 40 in the open position. For example, the lid 40 is slidably attached to the collection box 3. Alternatively, the lid 40 may be rotatably attached to the collection box 3. Alternatively, the lid 40 may be removable from the collection box 3. When the garbage collection watercraft 1 moves backward, the intake port 21 is closed by the lid 40 so that the backflow of garbage from the collection box 3 is prevented.

The structure of the hull 2 is not limited to that of the above preferred embodiments, and may be modified. For example, in the above preferred embodiments, the hull 2 is a so-called catamaran boat, but may be another type of watercraft.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A garbage collection watercraft comprising:
   a hull;
   a collection box including an intake port to receive garbage, the collection box being movably held by the hull at a collection position in which the collection box is at least partially located underwater and at a pull-up position located higher than the collection position;
   a buoyant material attached to the collection box to raise the collection box from the collection position to the pull-up position by a buoyant force; and
   a stopper able to switch between a first fixed state to fix the collection box to the hull at the collection position and a released state to release the collection box; wherein
   the buoyant material is attached to a bottom surface of the collection box; and
   in a case that the stopper is set to the released state, the buoyant material raises the collection box from the collection position to the pull-up position by the buoyant force.

2. The garbage collection watercraft according to claim 1, wherein the stopper is able switch to a second fixed state to fix the collection box to the hull at the pull-up position.

3. The garbage collection watercraft according to claim 1, wherein the intake port is located on a front surface of the collection box.

4. The garbage collection watercraft according to claim 3, wherein the hull includes a box storage area that opens forward; and
   the collection box is located in the box storage area.

5. The garbage collection watercraft according to claim 3, wherein a rear surface of the collection box includes mesh.

6. The garbage collection watercraft according to claim 5, wherein the hull includes a through hole located behind the collection box.

7. The garbage collection watercraft according to claim 1, wherein the hull includes:
   a first boat;
   a second boat spaced apart from the first boat in a left-right direction of the hull; and
   a connector to connect the first boat and the second boat, and
   the collection box is located between the first boat and the second boat.

* * * * *